(12) United States Patent
Sturm

(10) Patent No.: US 10,483,811 B2
(45) Date of Patent: Nov. 19, 2019

(54) STATOR HAVING ADAPTED TOOTH GEOMETRY WITH TEETH HAVING CIRCUMFERENTIAL PROJECTIONS

(71) Applicant: ebm-papst Mulfingen GmbH & Co. KG, Mulfingen (DE)

(72) Inventor: Michael Sturm, Bad Mergentheim (DE)

(73) Assignee: EBM-PAPST MULFINGEN GMBH & CO. KG, Mulfingen (DE)

( * ) Notice: Subject to any disclaimer, the term of this patent is extended or adjusted under 35 U.S.C. 154(b) by 58 days.

(21) Appl. No.: 15/569,256

(22) PCT Filed: Apr. 18, 2016

(86) PCT No.: PCT/EP2016/058551
§ 371 (c)(1),
(2) Date: Oct. 25, 2017

(87) PCT Pub. No.: WO2016/173873
PCT Pub. Date: Nov. 3, 2016

(65) Prior Publication Data
US 2018/0123406 A1 May 3, 2018

(30) Foreign Application Priority Data
Apr. 28, 2015 (DE) .................. 10 2015 106 523

(51) Int. Cl.
*H02K 3/00* (2006.01)
*H02K 1/14* (2006.01)
(Continued)

(52) U.S. Cl.
CPC ............. *H02K 1/146* (2013.01); *H02K 1/165* (2013.01); *H02K 3/345* (2013.01); *H02K 2213/03* (2013.01)

(58) Field of Classification Search
CPC .......... H02K 1/16; H02K 1/165; H02K 1/146; H02K 2213/03; H02K 3/30; H02K 3/32;
(Continued)

(56) References Cited

U.S. PATENT DOCUMENTS 4,161,669 A * 7/1979 Aimar .................... H02K 3/522
310/194
6,127,760 A * 10/2000 Nagasaki ............... H02K 1/146
310/194
(Continued)

FOREIGN PATENT DOCUMENTS

EP      1 873 889 A2     1/2008
JP      2002 335642 A    11/2002
(Continued)

OTHER PUBLICATIONS

WO2013132775A1 English Translation.*
(Continued)

*Primary Examiner* — Mang Tin Bik Lian
*Assistant Examiner* — Maged M Almawri
(74) *Attorney, Agent, or Firm* — Brinks Gilson & Lione

(57) ABSTRACT

The invention relates to a stator of an electric motor, having teeth distributed in the circumferential direction and extending in the radial direction and grooves respectively provided between the teeth, wherein respectively adjacent teeth each form a groove opening at the radial outer edge sections of said teeth, and the radial outer edge sections of the teeth each have a projection extending into the groove opening in the circumferential direction and each forming a free contact surface directed radially inward.

7 Claims, 3 Drawing Sheets

(51) Int. Cl.
 *H02K 1/16* (2006.01)
 *H02K 3/34* (2006.01)

(58) Field of Classification Search
 CPC .......... H02K 3/34; H02K 3/325; H02K 1/187; H02K 3/345
 USPC .................. 310/216.069, 216.071, 214, 215, 310/216.001–216.112
 See application file for complete search history.

(56) References Cited

U.S. PATENT DOCUMENTS

| | | | | |
|---|---|---|---|---|
| 6,414,413 | B1* | 7/2002 | Arai | ........................ H02K 1/146 29/596 |
| 9,331,537 | B2* | 5/2016 | Bang | ........................ H02K 3/345 |
| 2010/0141079 | A1* | 6/2010 | Chu | ........................ H02K 3/325 310/215 |
| 2013/0214635 | A1* | 8/2013 | Yabe | ........................ F04B 35/04 310/197 |
| 2015/0076954 | A1* | 3/2015 | Johnson | ................ H02K 3/487 310/214 |

FOREIGN PATENT DOCUMENTS

WO    WO 2012/026158 A1    3/2012
WO    WO-2013132775 A1 *   9/2013   ............. H02K 1/146

OTHER PUBLICATIONS

Analysis of Motor Loss in Permanent Brushless Motors by Toda Dating Oct. 2005.*
International Search Report, International Serial No. PCT/EP2016/058551, dated Mar. 11, 2016, 3 pages.

* cited by examiner

STATOR HAVING ADAPTED TOOTH GEOMETRY WITH TEETH HAVING CIRCUMFERENTIAL PROJECTIONS

RELATED APPLICATIONS

This application claims priority to German Patent Application No. 10 2015 106 523.1, filed on Apr. 28, 2015; and PCT/EP2016/058551 A1, filed Apr. 18, 2016.

FIELD

The invention relates to a stator of an electric motor, having teeth distributed in the circumferential direction and extending in the radial direction and grooves respectively provided between the teeth, in which grooves copper wire windings are accommodated.

BACKGROUND

Electric motors are used with stators in environments with different pollution degrees. The higher the pollution degree is, the farther the current carrying components have to be removed from conductive components, so that no undesired discharge, i.e., short circuit, occurs. The spacing be maintained is determined here by the creepage and clearance distance, wherein, according to DIN VDE 0110-04.97, the clearance distance is defined as the shortest distance in air between two conductive parts, and the creepage distance is defined as the shortest distance along the surface of an insulating material between two conductive parts.

The creepage and clearance distances, particularly in the case of influence of pollution and humidity, must be much longer, so that the environmental air is not ionized by so-called pre-discharges and as a result breakdown can occur. No creepage or sliding discharges along the surface of the insulation material should occur.

In principle, if a stator is to be used in an environment with greater pollution (i.e., higher pollution degree), the creepage and clearance distance has to be longer. The values and spacings to be maintained here are defined by corresponding standard specifications. These standard specifications are determined depending on the requirements as well as the application fields and are established, for example, in the standards EN61800-5-1, EN60335-1, UL60730-1, UL1004-1 (-7) with reference to UL840.

However, in the dimensioning, one is subject to restrictions due to design, so that, in spite of the increase in the length of the creepage and clearance distances, the size of the stator cannot be increased for economic reasons. Here, moreover, the output, the torque and the degree of efficiency should also not become worse.

Therefore, in the prior art, slot closures are used in some cases, in which, however, the overlap has to be relatively large in order to ensure sufficient efficiency. The process is complicated and worsens the thermal factors.

Alternatively, the stator packet has been completely overmolded after the winding, so that it is protected from environmental influences and pollution. This process too is complicated and additionally cost intensive.

There are also solutions in the prior art in which the stator is coated entirely with powder coating material. However, here the stators first have to be cleaned, preheated, and subsequently vortex sintered or coated once or repeatedly. This process as well is very time and cost intensive.

Furthermore, in conventional stators, it is known to spray the grooves with plastic. Here, by increasing the groove opening width, more space for overmolding in the groove opening can be created, and the creepage and clearance distance can be increased. The groove opening is also referred to as "wiring trough" in the jargon of the field. However, this results in an undesired worsening of the motor cogging torque, which has a negative influence on noise generation.

BRIEF SUMMARY

Therefore, the aim of the invention is to increase, in a stator, the creepage and clearance distance in an economic manner, without negatively influencing performance and noise generation during operation. In addition, the introduction of insulation material into the grooves is to be facilitated.

This aim is achieved by a combination of features according to Claim 1.

Proposed here according to the invention is a stator of an electric motor, having teeth distributed in the circumferential direction and extending in the radial direction and grooves respectively provided between the teeth, wherein respectively adjacent teeth each form a groove opening (wiring trough) at the radial outer edge sections of said teeth, and the radial outer edge sections of the teeth each have a projection extending into the groove opening in the circumferential direction and each forming a free contact surface directed radially inward for accommodating an insulation. The projections provided on the adjacent teeth in the circumferential direction and facing one another make it possible to provide insulation in the circumferential direction up to the groove opening and in the radial direction further outward, so that the creepage and clearance distance of the wire windings accommodated in the respective grooves to the non-insulated stator region in the radial outer edge sections of the teeth of said region is increased. This increase in the creepage and clearance distance raises the pollution degree with which the stator and therefore the electric motor can be used. For internal rotor stators, the design of the invention is adapted, in that the teeth face radially inward.

Electric motors with the stator according to the invention can be used advantageously in connection with an open rotor and/or with an open motor/stator housing entailing optimal air cooling of the winding and of the ball bearing. This can open new application fields for conventional electric motors.

Furthermore, it is advantageous that, by means of the projections according to the invention on the teeth of the stator, the higher pollution degree can be reached with the same installation space, i.e., no adaptations to the geometry or to the fittings of the electric motor are necessary.

The respective projection provided on the teeth and extending into the groove opening can moreover be used as a deflector surface for the overmolding process of the groove interior. The projections increase the cross section in the groove opening area; they are used as a kind of flow aid for the injected insulation material and thereby prevent radially outward overspraying as well as flake formation in the groove opening (wiring trough), which would negatively affect the winding process of the wire windings. When hot, initially liquid insulation material—primarily liquid plastic—is injected into the groove at high pressure, the insulation material on the contact surface immediately cures due to the high temperature difference or becomes clearly less viscous and thus forms a protective barrier against radially outward overspraying.

For the same reason, overspraying in case of a later tool holding pressure can be avoided. By increasing the cross-sectional surface in the groove opening area, the injection pressure and therefore the risk of overspraying in the groove opening area can be reduced additionally.

Another advantageous effect of the projections is that they can be used as flow aid, since the cross-sectional surface for the overmolding composition is increased and as a result the grooves of the stator are filled better. Another consequence of this is that the material thickness of the insulation layer can be reduced.

In an advantageous design variant, it is provided that the respective projection radially outward forms a portion of an outer jacket surface of the stator. This means that the projections in the circumferential direction are formed as extension of the outer edge of the respective teeth. Insulation material can be introduced up to a radially further outer area of the projections into the grooves. The insulation material, which has been distributed up to the contact surfaces of the projections, forms an increased spacing or an increased creepage and clearance distance with respect to the wire windings accommodated radially farther inward within the grooves.

In another advantageous variant, it is provided according to the invention that the contact surface width in the circumferential direction corresponds to the projection width in the circumferential direction. The size of the respective projection is thus determined by the width of the radially inward facing contact surface. Moreover, an inner section of the radial outer edge sections of the teeth, directly adjoining the projection radially inward, has a rounding curved in the direction of the groove opening. This means that the respective projection, as closure of the contact surface, forms an edge, which the rounding of the inner section directly adjoins. Embodiment examples of the rounding comprise according to the invention predetermined radii, basket arches or free forms. The design and size thereof are, according to the invention, adapted to the greatest possible extent and with tangential transitions to the pole shoe thickness. Here, a ratio of pole shoe thicknesses to the radii is set preferably to a range between 0.5-1.5, more preferably 0.8-1.2.

The size of the respective projection is established in an advantageous embodiment example in that a ratio of the projection width in the circumferential direction to a groove opening width in the circumferential direction is in a range of 0.1-0.25, more preferably of 0.1-0.15. The projection width is selected to be as small as possible but sufficiently large so that the minimum insulation thickness of the overmolding material can be formed.

Furthermore, a ratio of the projection width in the circumferential direction to the projection thickness in the radial direction is set preferably to a range of 0.3-1.5, more preferably to a range of 0.5-1.0.

The size ratios provided ensure the above-described advantages with respect to the creepage and clearance distance and the improved possibility of introducing insulation material into the grooves. In addition, the mentioned size ratios allow a sufficiently large iron content of the stator material in the area of the groove opening, which directly has positive effects on the magnetic circuit, i.e., on the torque, the degree of efficiency, and the cogging torque.

The stator according to the invention is designed in an embodiment variant in that it comprises a plurality of stator sheets in the axial direction, each having a determined axial stator sheet thickness, wherein, however, the projection width provided is dimensioned larger than the stator sheet thickness. Projections having the width according to the invention allow sufficient strength, they can be punched reliably and they withstand the high injection pressures when the insulation material is introduced.

In an advantageous embodiment, in an axial top view, the shape of the respective projection has a rectangular cross section. Here, "rectangular cross section" is explicitly defined as non-sharp-edged design which comprises punch radii, which are determined as required by the fabrication technology, of 0.15 mm, for example.

The invention further relates to a design of the stator with insulating overmolding made of plastic in the grooves, wherein the overmolding covers at least an inner wall surface of the grooves and the radially inward directed free contact surface of the projection. In the insulated grooves, the wire windings, preferably made of enameled copper wire, are accommodated.

In an advantageous application example of stators of electric motors according to the invention, the projection width in the circumferential direction is between 0.1-1 mm.

DETAILED DESCRIPTION

Figure 1:
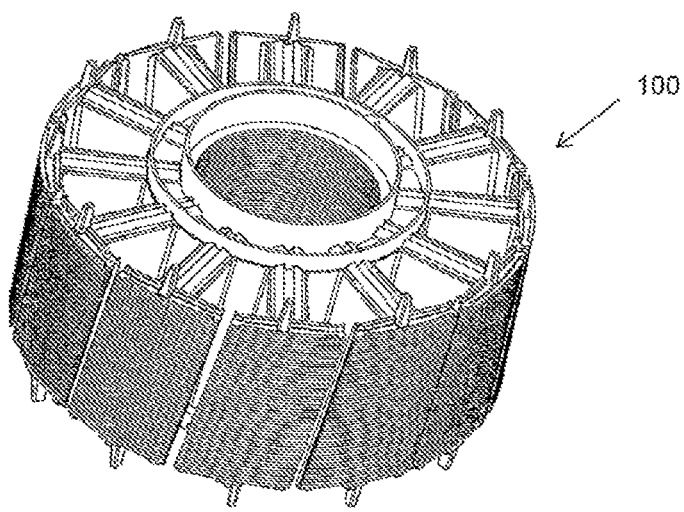
FIG. 1 shows a stator according to the prior art in a perspective view.
Figure 2:
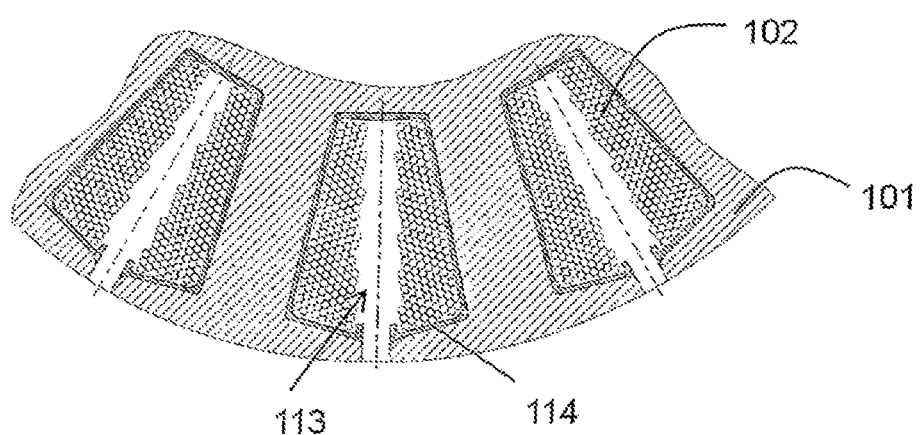
FIG. 2 shows a lateral partial cross-sectional view of the stator from FIG. 1.

FIGS. 1 and 2 represent a stator 100 according to the prior art having teeth 101 arranged distributed in the circumferential direction, wherein, between the teeth 101, respective grooves 113 for the accommodation of winding wire 102 are provided. The winding wires 102 are insulated with respect to the stator sheet by an overmolding 114 in the grooves 113. The design represented has a relatively short creepage and clearance distance between the winding wire 102 and the stator sheet of the teeth 101, so that the stator is designed for use with a pollution degree 2. Pollution degree 2 is defined such that only nonconductive pollution occurs, but occasionally temporary conductivity due to condensation is to be expected.

Figure 3:
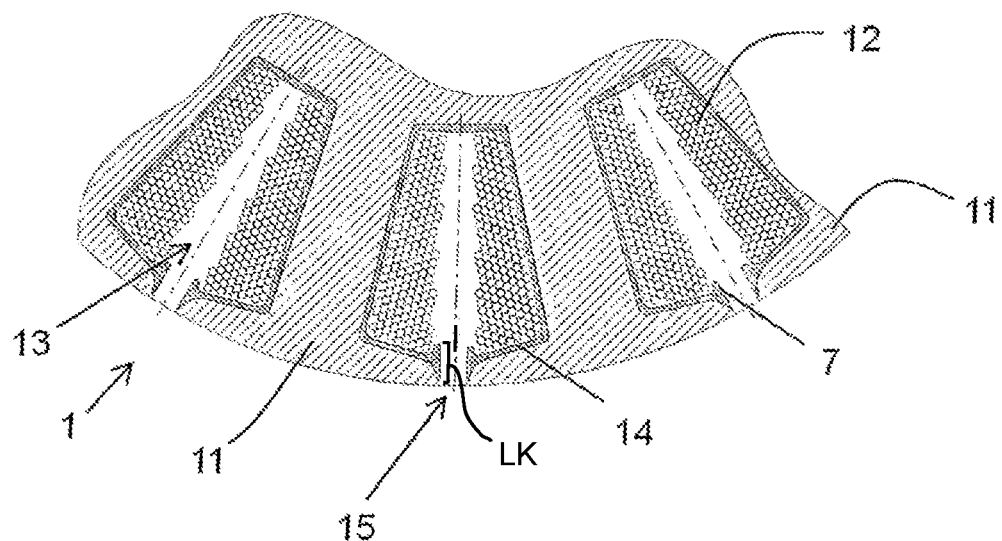
FIG. 3 shows a lateral partial cross section of the external rotor stator according to the invention.
Figure 4:
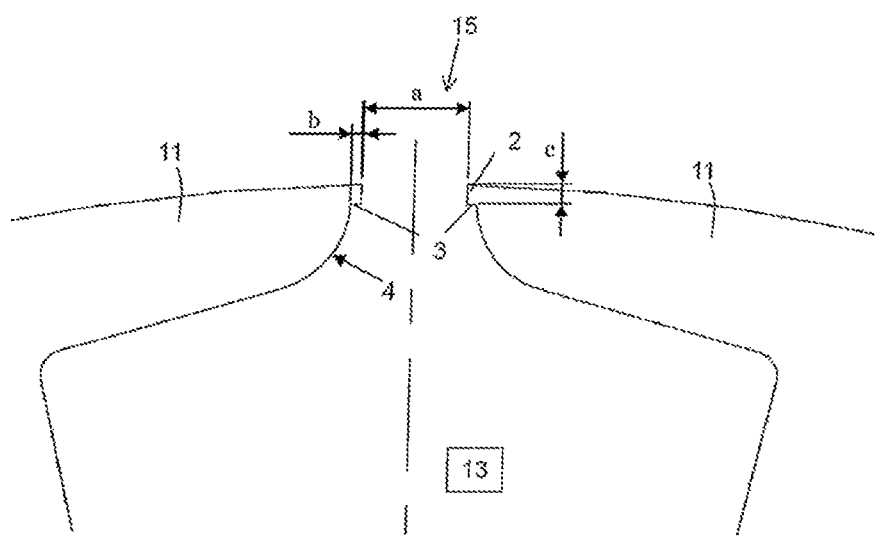
FIG. 4 shows a detail view of two adjacent stator teeth of a stator according to FIG. 3 in a lateral view.
Figure 5:
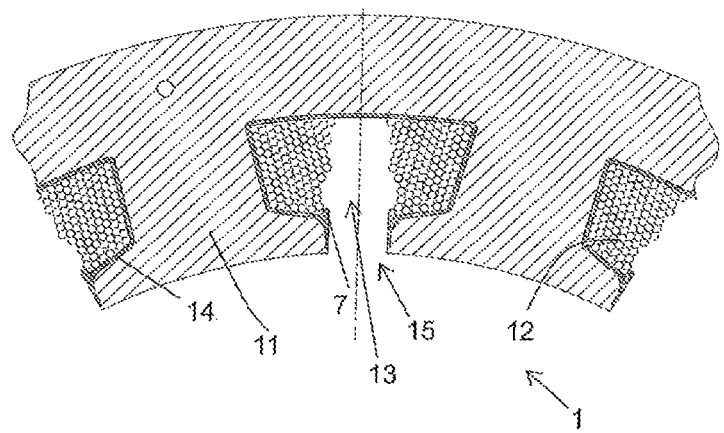
FIG. 5 shows a lateral partial cross-sectional view of the internal rotor stator according to the invention.

FIGS. 3 and 4 show an embodiment example of the stator 1 according to the invention as external rotor stator for use with pollution degree 3, which is defined such that conductive pollution or dry non-conductive pollution occurs, which thus also will become conductive since condensation is to be expected. All the features disclosed for the embodiment example according to FIG. 3 apply mutatis mutandis also to the design according to FIG. 5 in which the inventive stator 1 is represented as internal rotor stator.

The basic design of the stator 1 of FIGS. 3 and 4 corresponds to the design according to FIG. 1. Stator 1 comprises teeth 11 extending in the radial direction and having, in cross section, T-shaped radial outer edge sections and respectively grooves 13 provided between the teeth 11, wherein respective adjacent teeth 11, at the radial outer edge sections thereof, each form a groove opening 15, via which the winding wire 12 is introduced preferably by needle and/or flyer winding into the grooves 13. Via the groove openings 15, pollution also reaches the grooves 13, which, in the most unfavorable case, can lead to short circuit between the winding wire 12 and the teeth 11. To avoid this, in the design according to FIGS. 3 and 4, the creepage and clearance distance LK between the winding wire 12 and the conductive material of the teeth 11 is increased in comparison to the solution known from the prior art. The radial outer edge sections of the teeth 11 have, on both sides, a respective projection 2 extending in the circumferential direction into the groove opening 15, projection which forms a respective radially inward directed free contact surface 3. The projections 2 extend along the outer jacket surface of the stator 1 and, on the outer side, form a flush extension of the teeth 11. The contact surface 3 ends with an edge, which the inner section 4 adjoins directly radially inward. The inner section 4 is designed with a convex rounding.

In the embodiment example represented according to FIG. 4, the size of the respective projection 2 is dimensioned such that the ratio b/a of the projection width b in the circumferential direction to the groove opening width a in the circumferential direction is 0.12. The ratio b/c of the projection width b to the projection thickness c in the radial direction is set to 0.7. The projection width b is here defined as the width of the contact surface 3. In the area of the projection 2 in each case extending in the circumferential direction, the groove opening width a is smallest. The above-mentioned values relate to the groove opening width in this area. The shape of the projection 2 has a rectangular cross section according to FIG. 4, wherein the punch radii generated during the punching of the stator sheets must be taken into account.

FIG. 3 shows the stator 1 with insulating plastic overmolding 14 which is injected into the grooves 13, coating the entire inner wall surface of the grooves 13. In the area of the respective projection 2, the overmolding 14 extends to the respective radially inward directed free contact surface 3, covering it completely. Due to the respective projection 2 and the contact surface 3 formed therefrom, the insulated surface within the grooves 13 is extended further radially outward, so that the creepage and clearance distance LK is increased. For the fixation of the winding wire 12 within the grooves 13, the overmolding comprises retaining collars 7 which extend radially inward and prevent the winding wire 12 from sliding out of the groove opening 15.

The winding wire 12 used is a enameled copper wire with a predetermined wire diameter depending on the motor power.

The invention is not limited in design to the above-indicated preferred embodiment examples. Instead, many variants that use the solution represented, even in designs of fundamentally different type, are conceivable. For example, the edge areas of the projections extending into the groove opening can be rounded, in order to simplify an introduction of the wire winding needle. In order to increase the creepage distance, the projection in each case can also have an axial groove which extends, for example, in the center along the projection.

The invention claimed is:

1. A stator of an electric motor, having teeth distributed in a circumferential direction and extending in a radial direction, and grooves respectively provided between the teeth, wherein respectively adjacent teeth each form a groove opening at the radial outer edge sections of said teeth, and the radial outer edge sections of the teeth each have a projection extending into the groove opening in the circumferential direction and each forming a free contact surface directed radially inward, wherein a contact surface width in the circumferential direction corresponds to a projection width (b) in the circumferential direction, and
 a ratio b/a of the projection width (b) in the circumferential direction to a groove opening width (a) in the circumferential direction is in a range of 0.1-0.15 and a ratio b/c of the projection width (b) in the circumferential direction to a projection thickness (c) in the radial direction is in a range of 0.5-1.0,
wherein, in an axial top view, each respective projection has a rectangular cross section,
wherein the grooves have an insulating overmold made of plastic, which covers at least one inner wall surface of the grooves and the radially inward directed free contact surface of the projection.

2. The stator according to claim 1, wherein each projection forms radially outwardly a portion of an outer jacket surface of the stator.

3. The stator according to claim 1, wherein an inner section of the radial outer edge sections of the teeth, directly adjoining the projection radially inward, comprises a rounding.

4. The stator according to claim 1, wherein, in an axial direction, the stator includes a plurality of stator sheets each having an axial stator sheet thickness, and wherein the projection width (b) is greater than the stator sheet thickness.

5. The stator according to claim 1, wherein the groove opening width (a) is smallest in the area of the respective projection extending in the circumferential direction.

6. The stator according to claim 1, wherein the projection width (b) in the circumferential direction is between 0.1-1 mm.

7. The stator according to claim 1, wherein the insulating overmold has an outward radial extent that terminates at the free contact surface of the projection.

* * * * *